Jan. 26, 1932.  H. F. BLANCHARD  1,842,384
ACCELEROMETER
Filed Feb. 17, 1931
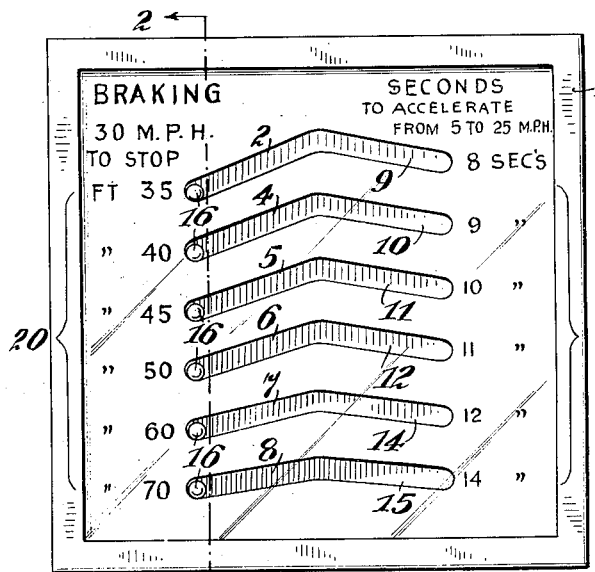
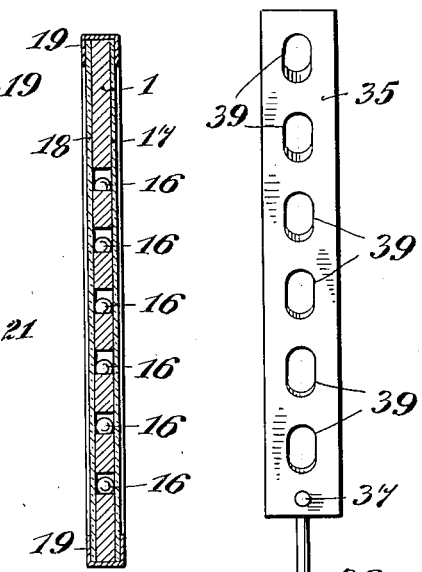
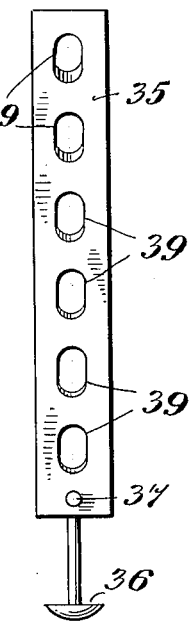
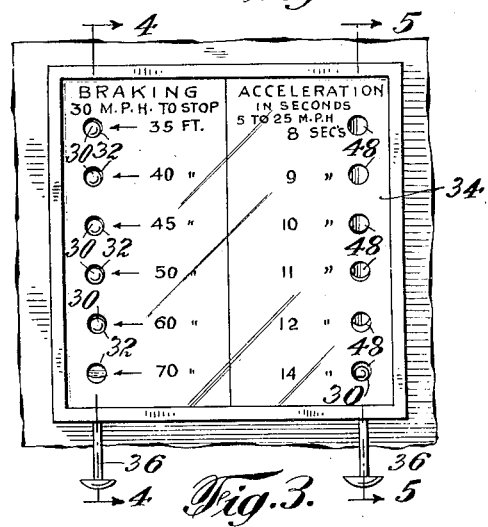
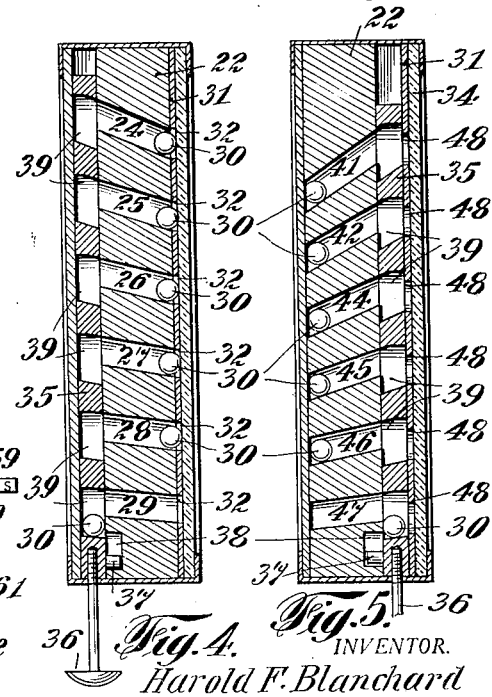
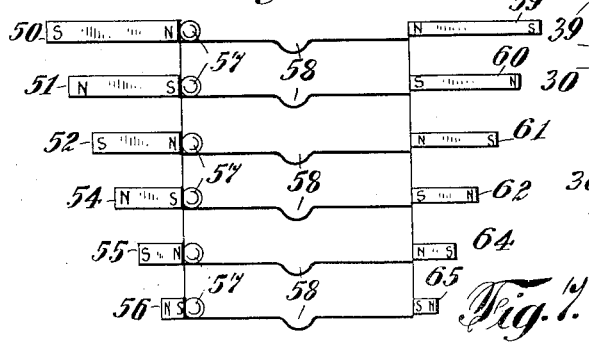
INVENTOR.
Harold F. Blanchard
BY Ramsey & Kent
his ATTORNEYS.

Patented Jan. 26, 1932

1,842,384

UNITED STATES PATENT OFFICE

HAROLD F. BLANCHARD, OF TUCKAHOE, NEW YORK

ACCELEROMETER

Application filed February 17, 1931. Serial No. 516,356.

The present invention relates broadly to precise instruments and more especially to an accelerometer and decelerometer.

The device comprising the present invention is adapted more especially for use with conveyances such as automobiles, motor boats, airplanes or other moving vehicles.

It is frequently desirable to determine in connection, more especially with an automobile equipment, the efficiency of the braking system and also the efficiency of the power unit, whereby it may be accurately ascertained as to the distance in which the automobile may be brought to a stop from a predetermined speed or the time in which the automobile may be accelerated up to a predetermined speed.

The present invention comprises broadly the utilization of indicating members arranged in series as to their effective indicating movement under the influence of changing speeds.

One embodiment of the invention comprises a plurality of inclined runways with the inclination of each runway being slightly greater than the other and on predetermined calibrated inclines, and small spheres preferably steel balls, arranged on the runways; so that with the device substantially on a level line, in an automobile, the spheres on certain of the inclined paths will move upwardly due to their inertia when the automobile is accelerated or decelerated as will hereinafter be more fully explained. The spheres which start to move, assuming the rate of speed change to be constant, will continue their movement as far as the runways will permit until the rate of speed change is stopped. By observing the spheres which have moved relative to those which have not moved, the rate of deceleration or acceleration is determined as between the last sphere on the scale which did not move and the rate of speed change represented by the adjacent sphere which did move.

The invention broadly may be stated to be a construction including a mass which does not move until the inertia of the mass due to the rate of speed change exceeds a predetermined amount, at which time movement of the mass occurs. The amount of force required to move adjacent masses is controlled in such manner as to comprise a scale for observation.

The present invention may be embodied in different structures from those herein disclosed and it therefore is to be understood that the disclosure herewith is illustrative and not to be considered in the limiting sense.

Fig. 1 illustrates a side view of a device according to the present invention constructed in portable form.

Fig. 2 is a sectional view on line 2—2 of Fig. 1.

Fig. 3 illustrates one form of the device as an instrument adapted to be mounted on the instrument board of an automobile, airplane, or the like.

Fig. 4 is a sectional view on line 4—4, Fig. 3.

Fig. 5 is a sectional view on line 5—5 of Fig. 3.

Fig. 6 illustrates a resetting slide used in the construction shown in Figs. 3, 4 and 5.

Fig. 7 diagrammatically illustrates the invention as being carried out by the use of permanent magnets.

Referring to the drawings and more especially to Figs. 1 and 2, which illustrate one embodiment of the device adapted for automobile use, a body member 1 is provided with a plurality of slots comprising upwardly inclined portions 2, 4, 5, 6, 7, and 8 and downwardly inclined portions 9, 10, 11, 12, 14 and 15. The upwardly inclined portions gradually decrease in inclination from the upper inclined portion 2 to the lowest inclined portion 8. Each of these slots carry small spheres 16 preferably comprising small steel balls. A pair of transparent plates 17 and 18 of glass or other suitable material are secured on the sides of the body portion 1 by means of the frame 19 and these side members retain the spheres 16 within their respective slots. As illustrated in Fig. 1, the left ends of the slots 2 to 8 inclusive are associated with a scale adapted for use in brake testing. The readings on this scale are associated with the inclination of the portions of the slots 2 to 8 to a horizontal line with reference to the inertia of the spheres as produced by deceleration. The construction of the device and the scale provided as illustrated in Fig. 1 is adapted to test the efficiency of brakes of an automobile in decelerating the speed of the car from thirty miles per hour to stop. With the device set on the side window sill of the car with the scale 20 for braking toward the rear end of the car and with the car running at thirty miles per hour, the brakes are applied and if the three lower balls move up the inclines 6, 7, and 8 and over into the declines 12, 14 and 15, the car has been stopped at such rate that the car speed will diminish from thirty miles per hour to zero in a distance between forty-five and fifty feet. If all of the spheres except the top sphere move over from the left end of the slots to the right ends thereof, then the rate of deceleration is equal to stopping the car from a thirty mile per hour speed in a distance between thirty-five and forty feet. If all of the spheres move over from the left end to the right end of the slots, then the car has been decelerated from thirty miles per hour to stop within a distance of thirty-five feet or less. With this instrument, it is not necessary to bring the car to a complete stop because shortly after the brakes become effective, the spheres move in accordance with the deceleration rate and the effectiveness of the brakes may be quickly determined because if the braking is continued, the car will be brought to a complete stop within the number of feet as indicated by the movement of the spheres.

If it is desired to test the acceleration of the car, the device is tipped edgewise to cause all of the steel balls 16 to move to the right end of the slots, where these balls will remain at rest due to the fact that the portions of the slots in which the balls are now located are inclined from left to right relative to the position of rest of the spheres. If the car is now accelerated, the inertia of the balls carry such balls to the left as have sufficient momentum to roll up the graduated inclines. The scale 21, for example, is associated with the right ends of the slots to indicate acceleration in seconds from five to twenty-five miles per hour. If only the lower ball moves during the period of acceleration, then the car has accelerated from five to twenty-five miles an hour at a rate of between fourteen and twelve seconds. If all of the balls except the one at the top have moved from right to left, then the acceleration from five to twenty-five miles per hour has taken place in a time period between eight and nine seconds. If all of the balls have moved from right to left, then the acceleration from five to twenty-five miles per hour has taken place in eight seconds or less.

It will be observed that the inclined portions at the left of the middle of the grooves is greater than the inclinations at the right of the middle of the grooves. This is for the reason that deceleration usually takes place at a more rapid rate than acceleration and therefore steeper inclines are used to indicate deceleration than are used to indicate acceleration.

Figs. 3, 4, 5 and 6 illustrate an equipment in accordance with the present invention adapted to comprise an instrument board device for use on automobiles or the like. In this form of the device, a body 22 is provided on the right side thereof, as viewed from the front in Fig. 3, with upwardly inclined runways 24, 25, 26, 27, 28 and 29. Steel balls 30 are provided in each of the said runways which are of graduated inclination with the slot 21 having the greatest inclination and the slot 29 the least. The front plate 31 is provided with openings 32 at the front ends of these ball runways. A suitable transparent cover 34 covers the front plate 31, and comprises a stop to prevent the balls from escaping from the ball runways. A resetting slide 35 is provided with a handle 36 and carries a stop pin 37 which operates in a slot 38 in the body 22. This resetting slide is provided with openings 39 of such size as to retain any ball which rolls up the ball passageway. Upon raising the handle 36 to the limit allowed by the stop in 37 in the slot 38, these balls roll out of the resetting bar and back into position against the cover glass 34, in view of the fact that the holes 39 in the reset slide are slightly inclined toward the front of the device. A braking or decelerating scale 40 is associated with the openings 32 and the balls 30 are normally in position to be viewed by the operator through the openings 32. Assuming that a test is to be made, the brakes are applied and the car decelerates at such a rate that the lowest ball disappears from the lower opening 32 as illustrated in Figs. 3 and 4. This immediately informs the operator that the brakes are operating at such rate that he can stop the car going at a thirty mile per hour rate in a distance of seventy feet, and as other balls disappear from view during braking test, the reading of the scale indicates the distance in which the car may be brought to a stop from a thirty mile speed.

The right half of the instrument as illustrated in Figs. 3 and 5 is constructed to register acceleration and in this case, the ball runways 41, 42, 44, 45, 46 and 47 are inclined in the opposite direction, namely, from the back of the body 21 toward the face of the instrument board. These runways 41 to 47 are likewise of graduated inclination and the reset bar 35 is now provided adjacent the face plate 31. The face plate is provided with openings 48 identical with the openings 32 at the left. These openings 48 are associated with a scale 49 which is graduated to represent the rate of acceleration from five to twenty-five miles in seconds. If the car is accelerated, and the operator observes the lower ball 30 to be visible, then the rate of acceleration has been at least equal to increasing the speed of the car from five to twenty-five miles in fourteen seconds. If two balls are visible, then the rate of acceleration has been at least five to twenty-five miles in twelve seconds, etc.

The invention may be embodied in other forms, for example, the form diagrammatically illustrated in Fig. 7 in which permanent magnets 50 to 56 correspond to the inclinations 2 to 8 in Fig. 1. These permanent magnets accelerate a predetermined holding force upon the steel balls 57. As the car is decelerated, the steel balls which are under the least magnetic influence will be pulled away from their respective magnets due to inertia of the balls and will roll to the stop pockets 58 in the middle of the runways. Since the magnets 50 to 56 are graduated in strength, the movement of the steel balls from the magnets again becomes an indicator of the rate of deceleration on each ball in its respective magnet representing a point on a predetermined scale. The magnets 59, 60, 61, 62, 64 and 65 shown at the right of Fig. 7 are weaker magnets than those shown at the left. When it is desired to use this instrument for acceleration, a strong magnet is applied to the steel balls to pull these balls away from the magnets at the left and carry the balls across so that they become attached to the magnets at the right. The device is now set for testing acceleration and the tests occur as previously described, namely, that the acceleration is determined by the steel balls which are pulled away from the respective magnets and lodge in the pockets 58. Of course, a magnet is used to lift the balls from the pockets 58 and carry them to whichever side of the instrument is to be used.

It is to be understood that the inclination of the ball runways, where this type of device is used, is determined by actual test in order to calibrate the first instrument. After a calibration has been obtained, then duplicates of the first instrument will be as accurate as the calibrated instrument. The same observation applies to the use of permanent magnets. In the case of permanent magnets, it may be necessary after long periods of time to recalibrate the device in view of the possible loss of magnetism from the said permanent magnets. In the form of device comprising inclined slots, however, no recalibration is necessary after the inclination of the slots has once been determined.

Having described my invention, I claim:

1. A device of the class described comprising a body member provided with a plurality of calibrated inclined slots, each of said slots being of predetermined inclination with the inclination of one slot being different from that of the adjacent slots, and spheres mounted in said slots and adapted to move in said slots in accordance with the rate of change at which said device is moved in the direction of the length of said slots.

2. A device of the class described comprising a body member provided with graduated inclined runways, movable means mounted in said runways, said runways being progressively inclined one to the other in accordance with a predetermined scale whereby each of said means will move in its particular runway when the inertia of said means due to change of speed with which said device is being moved in the direction of the length of said runways exceeds a force necessary to move said means upwardly on its inclined runway.

3. In a device of the class described, a plurality of movable indicators, graduated restraining means cooperative with said movable indicators, a scale associated with said plurality of indicators, and means to retain the indicators which move under the influence of inertia in a different position from the indicators which do not move whereby the indicators which move under the influence of inertia due to change in speed to which said device is subjected determines with reference to said scale the rate of said speed change.

4. In a device of the class described, a plurality of movable indicators normally tending to move under the force of inertia when said device is subjected to a change in speed, restraining means for each of said indicators normally holding said indicators from moving until the inertia force of said indicators exceeds said restraining means, said restraining means being graduated to form a series of graduated indicators adapted to indicate speed change, and a scale associated with said indicators.

5. A device of the class described comprising a body member provided with a plurality of inclined runways extending in the direction of movement to be measured, a movable member in each of said runways, said runways being progressively inclined one to the other in accordance with a predetermined scale whereby each member will only move in its particular runway when the inertia of said member due to change of speed in the direction of said runway exceeds a force necessary to cause said member to move upwardly on its inclined runway.

6. A device of the class described comprising a relatively flat body member provided with a plurality of inverted V-shaped runways, the inclination of the legs of said inverted V-shaped runways being graduated relatively to predetermined scales, spheres freely movable in said runways, and means to retain said spheres in position in said runways.

7. A device of the class described comprising a relatively flat body member provided with a plurality of inverted V-shaped runways, the inclination of the legs on one side of said inverted V-shaped members being graduated relatively to one scale, the inclination of the legs on the other side of the runways being graduated relative to another scale, spheres freely movable in said runways, and means to retain said spheres in position in said runways.

8. A device of the class described comprising a relatively flat body member provided with a plurality of inclined runways, spheres mounted in said runways, the inclination of said runways relative to the base of said device being graduated in accordance with a predetermined scale, transparent means covering one side of said runways whereby the position of said spheres may be observed.

9. A device of the class described comprising a body portion, a base on said body portion, a plurality of inclined runways provided in said body portion one above another, spheres freely movable in said runways, said runways being inclined one to the other in accordance with a predetermined scale, and means retaining said spheres in said runways with said spheres at one end thereof being visible.

10. A device of the class described comprising an instrument for indicating change of speed, said instrument being provided with a face plate, a body portion back of said face plate and having inclined runways therein, said runways being inclined relative to said face plate in accordance with a predetermined scale, a sphere in each of said runways, means for preventing a sphere which has passed up its respective runways from returning except at the will of the operator, and means for restoring such spheres to their respective runways.

11. A device of the class described comprising an instrument for indicating change of speed, said instrument being provided with a face plate, a body portion back of said face plate and having inclined runways therein, said runways being inclined relative to said face plate in accordance with a predetermined scale, and a sphere in each of said runways.

12. A device of the class described comprising a face plate, a body portion back of said face plate, said body portion being provided with a plurality of inclined runways, the inclination of said runways being graduated in accordance with a predetermined scale, spheres in each of said runways, a movable slide provided with openings adjacent the upper ends of said runways whereby spheres passing upwardly in said runways drop into said openings, and means to raise said slide whereby the bottom portion of said openings return said spheres to their respective runways.

13. A device of the class described comprising a face plate, a body portion back of said face plate, said body portion being provided with a plurality of inclined runways, the inclination of said runways being graduated in accordance with a predetermined scale, spheres in each of said runways, and means provided with openings adjacent the upper ends of said runways whereby spheres passing upwardly in said runways drop into said openings.

14. In a device of the class described, a plurality of movable means, each tending to move under the force of inertia produced therein by the change in speed to which said device is subjected, a scale, and a plurality of runways for said movable means, said runways being progressively upwardly inclined one to the other in accordance with said scale whereby each of said movable means is restrained from moving until the momentum thereof exceeds the force necessary to overcome the component of gravity restraining the movement thereof.

HAROLD F. BLANCHARD.